United States Patent [19]

Nakabe

[11] 4,108,638
[45] Aug. 22, 1978

[54] PROCESS FOR SEPARATING NICKEL, COBALT AND COPPER

[75] Inventor: Sanai Nakabe, Yokohama, Japan

[73] Assignee: Sumitomo Metal Mining Company Limited, Tokyo, Japan

[21] Appl. No.: 799,924

[22] Filed: May 24, 1977

Related U.S. Application Data

[63] Continuation of Ser. No. 645,422, Dec. 30, 1975, abandoned.

[30] Foreign Application Priority Data

Jan. 23, 1975 [JP] Japan ............................. 50-10059

[51] Int. Cl.$^2$ .................... C22B 15/00; C22B 23/02
[52] U.S. Cl. ............................. 75/63; 75/72; 75/74; 75/75; 75/82
[58] Field of Search ................ 75/63, 72, 82, 74, 75

[56] References Cited

U.S. PATENT DOCUMENTS

| 1,703,329 | 2/1929 | Wilenchik | 75/82 |
| 1,854,234 | 4/1932 | Stanley | 75/82 |
| 1,868,414 | 7/1932 | Gronwall | 75/82 |
| 2,758,020 | 8/1956 | Schlecht | 75/82 |
| 2,790,713 | 4/1957 | Kenworthy | 75/82 |
| 2,944,883 | 7/1960 | Queueau | 75/82 |
| 3,615,362 | 10/1971 | Warner | 75/63 |
| 3,682,623 | 8/1972 | Diercky | 75/82 |
| 3,773,494 | 11/1973 | Trewiner | 75/74 |

Primary Examiner—P. D. Rosenberg
Attorney, Agent, or Firm—Watson, Cole, Grindle & Watson

[57] ABSTRACT

This invention relates to a process for separating nickel, cobalt and copper wherein a molten mixture containing either or both of nickel and cobalt and copper as an alloy and a matte or either of them is mixed in the presence of a matte, metallic iron and carbon to form a high carbon ferrous alloy and a matte in two separate phases. Both nickel and cobalt or either of them is extracted predominantly in the high carbon ferrous alloy and copper is extracted predominantly in the matte.

33 Claims, No Drawings

PROCESS FOR SEPARATING NICKEL, COBALT AND COPPER

This is a continuation of application Ser. No. 645,422, filed Dec. 30, 1975, now abandoned.

DETAILED DESCRIPTION OF THE INVENTION

Nickel and cobalt are each often found naturally an oxidized materials rich in iron, such as manganese nodule or nickeliferous laterite. Cobalt is often wasted as slag along with iron in copper smelting or nickel smelting. Therefore, an alloy rich in metallic iron is often produced by reducing-smelting of the material in extracting the nickel and/or cobalt. The necessary production of a large amount of metallic iron by reducing of the oxidized iron, the need of a higher temperature in smelting because of the high melting temperature of the alloy than one in producing matte which causes consumption of an expensive heating energy such as electric power, and the low grade of the material, which is usually the case, impose a large burden of expense on unit amount of nickel and/or cobalt to be recovered, as is well-known. Especially, in extracting cobalt, production of alloy rich in iron in needed for recovery of cobalt as matte is poor.

Nickel is often naturally found associated with copper. It remains in the crude copper during smelting of the copper ore, and is recovered commercially from the spent electrolyte after the electrorefining of the copper. However, the recovery of nickel by this process is expensive and is of low yield.

A small amount of copper accompanying nickel can easily be eliminated for example by electrorefining of nickel but a large amount of copper accompanying nickel can be eliminated only with a large expense. Therefore, many processes have been developed for the separation of the copper but most are expensive except where separation of nickel sulfide and copper sulfide through differential flotation is successful.

The waste of copper, nickel and/or cobalt in the slag in copper smelting or nickel smelting is a problem, especially in many cases after a flash smelting process is applied to sulfide ores. One of the major reasons why recovery of values from such slag is difficult is that the slag contains a large amount of iron as magnetite. Since the solubility of magnetite in slag is limited, a large part of the magnetite stays in the slag as a mushy suspension and encloses small globules of the mate so that the recovery of the matte by settling is therely hindered. In addition, magnetite has a higher oxidation potential than nickel oxide and cobalt oxide which are also in the slag. Therefore, recovery of nickel and cobalt by reducing oxidized nickel and cobalt is not sufficient until the magnetite is thoroughly reduced into ferrous oxide. Unfortunately, however, magnetite is difficult to reduce with the iron sulfide that is rich in the matte at the temperature of a commercial smelting operation and reduction of magnetite is a large problem in recovering the values from the slag.

Carbon has a large potential for reduction, thermodynamically speaking and the reduction would proceed easily, for example, when a mixture of pulveried slag and coke breeze is heated but the heating expense is not justified in recovering a small amount of values in the slag. Reduction of magnetite in molten slag by carbon proceeds only under a strong super-heating of the slag as the reaction is strongly endothermic and this causes formation of a large amount of metallic iron. The result is that this metallic iron functions as a secondary reductant for magnetite and therefore the recovery is complete only after the formation of metallic iron in a far larger amount than that which is needed from a point of view of equilibrium. This is the reality in extracting values from the molten slag, and its economy depends on how far the heating expense is saved for raising the temperature of the large amount of slag to the required point and for the reduction of oxidized iron into metal.

Manganese nodule contains nickel, cobalt and copper in addition to a large amount of manganese and iron and is an important natural resources in the future. However it is not economically feasible to recover manganese, nickel, cobalt and copper by separating them from iron and from each other because of the said reasons.

Accordingly, it is the general object of this invention to provide a process for extracting copper and one or both of nickel and cobalt separately from a mixture of the elements.

It is the main object of this invention to provide a process for treating molten product(s) from smelting of material(s) containing copper, nickel and/or cobalt in molten state to effect a rough separation of copper and the other element(s) so that further separation in refining steps is facilitated.

It is another object of this invention to provide a process whereby the separation is effected economically by the utilization of the metallic iron that is often produced in extracting nickel and/or cobalt from an oxidized material rich in iron.

It is another object of this invention to provide a process for extracting nickel, cobalt and/or copper from manganese nodule, slag from copper smelting or nickel smelting and other oxidized materials rich in iron.

It is another object of this invention to provide a process for extracting cobalt as a byproduct of copper smelting and/or nickel smelting.

It is another object of this invention to provide a process for extracting nickel and cobalt separately from a mixture containing them.

The ordinary matte produced in copper smelting or nickel smelting is a quaternary mixture consisting of copper or nickel, iron, sulfur and oxygen and it contains iron oxide, even magnetite, but practically no metallic iron. It does not separate into an alloy and a matte in the molten state except in a high copper region. However, under more reducing conditions that are seldom encountered in commercial operation, a matte can dissolve metallic iron to a considerable extent when little iron oxide is present; and the matte is practically a ternary mixture of copper or nickel, iron and sulfur.

It is well-known that an alloy and a matte can co-exist in equilibrium in molten state in a large region of the ternary system copper-iron-sulfur. However large amounts of copper are contained both in the alloy and the matte, and it is difficult to extract a major part of copper into matte based on this principle. No separation into an alloy and matte takes place in the ternary systems nickel-iron-sulfur and copper-nickel-sulfur. A process for separating copper as matte and nickel or cobalt as alloy by addition of metallic silicon to the alloy is a process devised by the inventor and other and patented as the Japanese Pat. No. 164,633; but the process is not fully economical because of the high price of metallic silicon.

The inventor studied the equilibrium in molten state of the quinary system of nickel or cobalt, copper, iron, sulfur and carbon and found that a mixture of the system can be separated into two phases, a high carbon ferrous alloy and a matte, and that a major part of nickel and/or cobalt is extracted in the alloy while the copper is in the matte. The present process is based on this principle.

Generally states, the present process is a process for separating nickel, cobalt and copper comprising mixing a molten mixture containing copper and one or both of nickel and cobalt that consists of alloy(s) and/or matte(s) in the presence of a matte, metallic iron and carbon that can be combined as iron carbide, thereby forming by the reaction between the existing components a high carbon ferrous alloy containing a major part of the nickel and/or cobalt and a matte containing a major part of the copper in two separate phases.

The present process will be explained more in detail as follows.

The mixture to be treated by the present process, hereafter to be named "mixture A", can be an alloy or alloys, a matte or mattes or a combination of more than one of them and contains copper and one or both of nickel and cobalt. The alloy may contain copper besides nickel and/or cobalt, and the matte may contain nickel and/or cobalt besides copper. The alloy and/or the matte may also contain metallic iron which can stay dissolved in the alloy or matte in molten state. The mixture A can be produced by smelting ore or other material. The matte to be present in the present process can contain one or more of copper sulfide, iron sulfide, nickel sulfide and cobalt sulfide as its main component and it can be produced by the reaction between metal and elemental sulfur or a sulfur compound which is supplied when the amount of sulfur is not enough to convert a major part of the copper into matte. The metallic iron to be present in the present process, including that combined as iron carbide, must be greater in weight than the total weight of nickel and cobalt in the "mixture A". However, metallic iron is not always necessary to be present as a separate phase, but may be present as dissolved in the matte. If the amount of metallic iron contained in the mixture A is insufficient for the reaction of the mixture even after adding the amount of the metallic iron produced by the equation of $2Cu + FeS = Cu_2S + Fe$, it will be necessary to supplement a further amount of metallic iron or iron alloy. The carbon must be present in the resultant high carbon ferrous alloy at higher than 0.5% C, and any shortage as a component of the alloy in "mixture A" must be supplied by pig iron, a high carbon ferrous alloy or by carburization of ferrous alloy or a matte containing metallic iron under contact with solid carbon at high temperature. The separation of copper and nickel and/or cobalt is more complete. When the carbon content of the resultant high carbon ferrous alloy is higher. It is needless to say that a temperature of about 1.150° C or higher, the temperature of which a high carbon ferrous alloy melts, is required for the reaction.

Silicon is often contained in an alloy resulting from reducing smelting of oxidized material in extracting nickel and/or cobalt and it is helpful, as has been explained, for the separation in the present process to produce a high carbon ferrous alloy containing some silicon.

The mixture can be mixed in the presence of matte, metallic iron and carbon in molten state, for example, simply by mixing the required components at room temperature followed by smelting. Smelting of ore can also be sufficient for mixing in the present process if the charge make-up is controlled so that a matte, metallic iron and carbon are present during the smelting operation as is shown in the following description. An alloy, or a matte in molten state can be percolated through a column of red hot lump coke for said mixing and carburization by the present process so long as the presence of the matte and the metallic iron is maintained. A molten matte may concurrently be percolated with the alloy, or an alloy containing metallic iron may concurrently be percolated with the matte, if needed. Holding molten alloy and matte in a hearth with heating or pouring them into a hearth is usually sufficient for the mixing, so long as the presence of matte, metallic iron and carbon is maintained. Agitation with inserted piece of green wood is also effective in this case. Alloy and matte separate into two layers quite rapidly, but the chemical reaction needed in the present process is also very rapid.

Thus the copper contained in an alloy can mostly be recovered along with copper in a matte, if any treated, in the resulting matte, while nickel and/or cobalt in the matte can mostly be recovered along with the nickel and/or cobalt in the alloy, if any treated, in the high carbon ferrous alloy resulting from the present process.

An alloy or a matte containing copper, iron, and at least one of nickel and cobalt can be treated by the present process after the following pretreatment. For example, a part of such alloy can be poured onto sulfur so that the required amount of matte is produced to constitute along with the rest of the alloy the mixture for the present process. For another example, metallic iron or an alloy containing metallic iron can be dissolved into such matte in the molten state to produce a matte containing metallic iron as the mixture for the present process. Alternatively, the alloy and the matte can be brought together as the mixture for the present process. Alternatively again, an alloy can by produced by smelting the raw material with addition of sulfur-bearing material so that it contains sufficient amount of sulfur to form by the present process a matte which contains a major part of the copper in the alloy. The amount of matte to be present in the present process in this case can theoretically be nothing at the start of the mixing while the matte appears at the end of the mixing.

Naturally, the amount of matte separating from a homogeneous alloy by carburization is limited and a large amount of copper in an alloy must be separated in such a large amount of matte that a heterogeneous mixture consisting of the alloy and a matte is treated by the present process. A similar situation applies to the amount of alloy or metallic iron needed in treating a matte containing a large amount of nickel and/or cobalt.

The present process can be utilized in connection with smelting of ore containing copper, nickel, cobalt and/or iron. For example, an ore or its calcine containing copper, iron, and nickel partly as sulfides and partly as oxidized compounds is smelted with addition of a carbonaceous reductant so that an alloy and a matte are formed and extracted in molten state to be treated as the mixture by the present process. Alternatively, a homogeneous mixture of an alloy or a matte can be produced in place of the alloy and the matte, depending on the ratio copper to nickel plus cobalt. For another example, an ore containing copper, iron, and at least one of nickel and cobalt as oxidized compounds can be smelted with addition of a carbonaceous reductant so that an alloy containing copper, iron and at least one of nickel and cobalt is extracted in molten state to be treated as one of the components of the mixture in the present process. Manganese nodule containing copper, iron, manganese, nickel and coablt can be treated similarly, and copper, nickel and cobalt can be recovered from the resulting alloy, while manganese can be recovered from the resulting slag by well-known means.

Alternatively, the alloy resulting from smelting manganese nodule can be treated by the present process so that it constitutes said mixture together with a nickel-copper matte produced, for example, from nickel-copper sulfide ore by smelting. In cases where a rich ore is smelted, a sufficient amount of carbon can be used to effect the carburization so that the present process is performed during smelting.

In treating a slag or oxidized ore containing one or both of nickel and cobalt, it may be smelted on a molten bath of copper matte or copper-nickel matte after dissolving metallic iron, or the bath may be agitated with addition of molten slag, to collect one or both of nickel and cobalt as an alloy dissolved in the matte, carburize the resulting mixture of alloy and matte, and separate one or both of nickel and cobalt in the high carbon ferrous alloy. This manner of operation is called hereafter as "process A".

The required temperature for the operation can be maintained in this case by the addition of calcium carbide or ferro silicon with agitation whereby it reacts with the iron oxide in the slag to form metallic iron required in the matte and generate a large amount of heat of reaction. The treated slag may repeatedly be discharged to renew the slag when the grade of the feed slag is low. The mother matte remaining after separating the high carbon ferrous alloy by carburization still contains a part of the nickel and/or cobalt and can be reverted to the treatment of slag with a result of practically all of the nickel and/or cobalt extracted into the bath of matte eventually being extracted in the high carbon ferrous alloy.

The converter slag resulting from bessemerization of a matte produced by flash smelting of sulfide copper ore or sulfide copper-nickel ore may be treated by "process A" on a bath of molten matte of low grade matte resulting from a slag clearing furnace; and cobalt that is usually mostly wasted as slag may be recovered.

A large amount of magnetite contained in the slag of copper smelting and nickel smelting may effectively be reduced into ferrous iron with metallic iron in the matte in "process A" with a result of liberating the globules of matte entrapped in mushy magnetite. This process is effective in recovering not only the cobalt or nickel contained in the slag as oxidized compound due to be wasted chemically, but also copper or nickel contained in the slag a as suspension of tiny globules that are usually wasted mechanically.

The matte resulting from the present process contains not only a major part of copper but also a minor part of one or both of nickel and cobalt. Therefore, it may be bessemerized to extract cobalt as a converter slag which may further be treated by "process A" or other well-known process to recover cobalt, while nickel is recovered as nickel sulfate in electrorefining of nickeliferous crude copper by well-known means. However, the inventor also studied the bessemerization of such a copper matte and developed a new process for separating nickel and cobalt and recovering one or both of nickel and cobalt as byproduct(s) of copper smelting as explained as follows.

As is well-known, a major part of the cobalt contained in a copper matte is oxidized in the slag blow in bessemerization where practically all of the iron in the matte is slagged off. The remainder of the cobalt is oxidized in the copper blow, where white metal, a bath of copper sulfide, is bessemerized to convert the copper sulfide into metallic copper, into a viscous scum which usually remains in converter after discharge of the finished crude copper to be included in the slag in the next batch of operation.

In the bessemerization of a copper matte containing nickel, most of the nickel stays in the matte in slag blow. Towards the end of the copper blow, a considerable amount of nickel is oxidized to form a scum which is left in the furnace to be treated in the next batch of operation. Therefore, in bessemerization of a copper matte containing both nickel and cobalt, the oxidized nickel in the scum is mixed with the converter slag from the slag blow of the next batch: and this makes it is difficult to extract cobalt as converter slag of low nickel grade. Thus it has generally been believed that it is difficult commercially to make an effective separation of nickel and cobalt in bessemerization of copper matte based on the tendency of cobalt oxdize in preference to nickel which has been well-known. Also recovery of nickel into crude copper has been very poor usually because of the nickeliferous converter slag being reverted to the primary smelting where nickel is wasted as slag. The new process developed by the inventor for solving the difficulty is as follows.

The copper blow may be somewhat extended in bessemerization of a copper matte containing nickel so that practically all of the nickel is oxidized along with a small part of copper, and this is controlled by the behavior of samples of molten copper on solidification. The so-called worming of copper, that is the phenomenon of molten copper erupting onto the solidified surface of copper just like a worm creeping on, is an indication for finishing the blow. The finished copper is then discharged, leaving the scum in the furnace whereby the separation of nickel is effected. The scum can be recovered by rotating the converter almost up-side-down where it drops or can be scraped out. Alternatively the extension of copper blow may be shortened to recover nickel partly as scum and partly from the crude copper as a byproduct of the electrorefining of copper.

The scum containing nickel also contains copper in an amount comparable to that of nickel, and it may be smelted under reducing conditions to extract the copper and nickel as an alloy which may be treated by the present process for separating copper and nickel.

Cobalt may partly be extracted as a slag from slag blow in bessemerization of copper matte containing nickel and cobalt, while the rest of the cobalt and most of the nickel are left in the white metal. The bessemerization of the white metal in the copper blow is suspended when most of the matte is converted into crude metal and matte is almost disappearing on the punching rod clearing tuveres; and the slag or scum formed is separated from the crude metallic copper. Thus most of the cobalt in the white metal is extracted into the slag or scum, while most of the nickel is still kept in the crude metallic copper, and nickel and cobalt are effectively separated according to the discovery by the inventor.

An extraordinary high efficiency of separation in a narrow range is shown in example 12 that follows in the latter part of the explanation. The slag or scum thus separated contains copper in high grade and can desirably be treated in the next batch of bessemerization of the copper matte while the bath of crude metallic copper may further be bessemerized in the said manner for treating copper matte containing nickel, and copper and nickel are recovered separately.

Nothing new has been developed for bessemerization of copper matte containing cobalt but no nickel, but the resulting converter slag may be treated by "process A" according to the present process with advantage.

The high carbon ferrous alloy produced by the present process can be treated by well-known hydrometallurgical means to recover cobalt, if it contains cobalt but little nickel. It may also be treated by "A Process for Recovering Cobalt" for which patent is applied by the inventor as Japanese application No. 49-17,923 whereby cobalt is recovered as a cobalt surface solution.

A high carbon ferrous alloy containing a large amount of nickel may be bessemerized with addition of a sulphur-bearing material, such as nickel matte, sulfur, or iron sulfide ore to recover nickel as finished matte. Metallic iron is oxidized in preference to iron sulfide, and metallic nickel reacts with iron sulfide in the matte according to the following equation

$$3Ni + 2FeS = Ni_3S_2 + 2Fe$$

to form metallic iron. Therefore, the alloy disappears, leaving matte and the bessemerization can be operated as easily as that of simple nickel matte at a similar temperature, and addition of a nearly stoichiometric amount of the sulphur-bearing material for formation of nickel sulfide only is needed. In other words, oxidation of sulphur can practically be prevented during the bessemerization. The resulting finished nickel matte contains some copper, for elimination of copper by the present process is not complete, but the amount of copper is small enough to be eliminated easily by the well-known electrorefining of nickel, for example.

A high carbon ferrous alloy containing nickel and cobalt, especially when it contains a large amount of nickel and a small amount of cobalt, may be treated similarly to recover nickel as finished matte, while most of the cobalt is extracted as converter slag along with most part of iron in the matte and a small part of nickel. Alternatively, a high carbon ferrous alloy containing nickel and cobalt, especially when it contains a large amount of cobalt and a small amount of nickel, may be bessemerized as dissolved in copper matte so that a major part of the cobalt is slagged off along with iron, leaving most of the nickel in matte. The and the resulting slag rich in cobalt is treated by "process A" to extract cobalt as a secondary high carbon ferrous alloy of low nickel grade. Such repeated application of the present process can be effective not only in separating nickel from cobalt but also in extracting cobalt as a secondary high carbon ferrous alloy of higher cobalt grade than the primary one. This is an effect of "process A" where a major part of the iron is eliminated as slag.

The converter slag containing nickel and cobalt produced by the said process or any material containing nickel and cobalt in general may be smelted along with cupriferous material to produce a copper matte containing nickel and cobalt which is bessemerized in the said manner to extract nickel, cobalt and copper separately. Alternatively slag or material containing nickel and cobalt may be smelted along with copper matte to extract most part of nickel into the matte while leaving major part of cobalt in the slag; and nickel and cobalt are recovered separately by the said process.

Material containing copper and one or both of nickel and cobalt may be treated in similar manner by the present process, combined with bessemerization of copper matte containing one or both of nickel and cobalt and/or bessemerization of high carbon ferrous alloy, if needed and the metals are recovered separately.

As has been explained, it is one of the advantages of the present process that complex material containing copper and one or both of nickel and cobalt can be treated by simple copper smelting process or copper smelting process and nickel smelting process with minor alternation to extract the metals separately. Esepecially, it is of advantage to combine smelting of such oxidized material rich in iron, for example, manganese nodule, laterite, slag from copper smelting or nickel smelting, that must be treated so that a large amount of metallic iron must be produced in extracting nickel and/or cobalt by reducing-smelting, with the present process so that the metallic iron produced may be utilized in separating copper from nickel and/or cobalt as the separation is achieved economically. It is expensive to treat a material at room temperature by the present process for a large heating expense is needed, but the intermediate product from smelting operation can be treated very economically while it is molten by the present process. It is advisable for an effective economic application of the present process to install the facilities related to the present process, for example, ones for reducing-smelting of oxidized material, copper smelting and nickel smelting, in adjacent position so that the alloy, matte and slag may be transported to the next processing in a molten state.

It is another advantage of the present process operated in the manner of "process A", that cobalt can be recovered economically from molten slag. Unlike well-known process whereby magnetite in the slag is mostly reduced with metallic iron in the undissolved alloy resulting from reducing-smelting, it is reduced with metallic iron dissolved in the matte. It is not necessary to heat a large amount of slag as high as the melting temperature of an undissolved alloy nor is it necessary to produce metallic iron substantially more in amount than needed for the chemical equilibrium of reduction of the oxidized cobalt in the slag, for the metallic iron has a large area of contact with slag as dissolved in matte.

It is another advantage of the present process operated in the manner of "process A" that the loss of copper or nickel as tiny globules of matte suspended in slag can be prevented by their settling due to elimination of magnetite in slag.

It is another advantage of the present process that nickel and cobalt in raw materials can be extracted separately as byproduct(s) of copper smelting or copper smelting and nickel smelting.

It is another advantage of the present process that nickel can be recovered as a byproduct of copper smelting by extracting it as a scum in bassemerization of copper matte.

This invention will be further illustrated by way of the following examples.

EXAMPLE 1

A molten alloy containing nickel, copper and iron was run into a graphite crucible containing sulfur, and the resulting sulfurized alloy was run in the molten state through a column of lump coke of a size of about 3cm packed into a height of about 2m with cross section of about 200 square cm and heated at about 1,400° C. The effluent melt was allowed to settle in a crucible and was broken apart into a top and a bottom by hitting after cooling. The weights and compositions of the charge and the products are shown in Table 1.

Table 1

| Material | Weight kg. | Composition weight % | | | | |
|---|---|---|---|---|---|---|
| | | Ni | Cu | Fe | S | C |
| alloy | 20 | 20.3 | 10.9 | 66.4 | tr | 0.4 |
| sulfur | 4 | | | | | |
| top | 2 | 5.4 | 51.6 | 17.8 | 20.9 | |
| bottom | 18 | 21.4 | 5.3 | 71.0 | 0.9 | 2.5 |

EXAMPLE 2

A nickel-copper matte and an iron-nickel-copper alloy were melted in a graphite crucible with addition of coke breeze at about 1,350° C and was agitated for about 5 minutes by an inserted carbon electrode and green wood and was then broken apart into top and bottom after cooling. The weights and compositions of the charged materials and products are shown in Table 2.

Table 2

| Material | Weight kg | Composition weight % | | | | |
|---|---|---|---|---|---|---|
| | | Ni | Cu | Fe | S | C |
| matte | 5 | 31.6 | 18.2 | 23.3 | 20.8 | |
| alloy | 20 | 20.3 | 10.9 | 65.4 | 0.7 | 0.4 |
| coke breeze | 2 | | | | | |
| top | 5 | 6.1 | 41.7 | 22.9 | 20.2 | |
| bottom | 20 | 26.5 | 4.8 | 65.2 | 0.8 | 2.4 |

This example shows that nickel in a mixture consisting of matte can be extracted into the high carbon ferrous alloy, that copper in a mixture consisting of an alloy can be extracted into the matte, and that nickel in a mixture consisting of an alloy and matte is extracted into the high carbon ferrous alloy while copper in the mixture into the matte by the present process.

EXAMPLE 3

A molten nickel matte and a molten alloy containing nickel, copper and iron were simultaneously run through a column of lump coke similar to the one used in Example 1 at about 1,400° C. The effluent melt was divided into about 10 kg of the top and the rest in a crucible to repeat similar percolations twice. The final effluent melt was allowed to settle in a crucible and was broken apart after cooling into a top and a bottom. The weights and compositions of the charged materials and products are shown in Table 3.

Table 3

| Material | Weight kg | Composition weight % | | | | |
|---|---|---|---|---|---|---|
| | | Ni | Cu | Fe | S | C |
| alloy | 40 | 20.3 | 10.9 | 65.4 | 0.7 | 0.4 |
| matte | 10 | 44.7 | 27.2 | 1.2 | 21.8 | |
| top | 10 | 6.7 | 48.2 | 16.1 | 20.4 | |
| bottom | 38 | 28.2 | 5.2 | 61.8 | 0.9 | 2.7 |

EXAMPLE 4

A molten copper matte was held in a ladle, molten cobaltiferous converter slag was run onto the bath of the matte, calcium carbide was added, and the whole was agitated for about 3 minutes by inserting a pole of green wood. Then the treated slag was discharged, leaving the matte in the ladle. A similar operation was repeated ten times altogether at a temperature of about 1,300° C.

The resulting mixture of matte and alloy was run through a column of lump coke similarly to Example 3 three times, and the final effluent was allowed to settle in crucibles to be broken apart into tops and bottoms after cooling. The weights and compositions of the charged and discharged materials are shown in Table 4.

Table 4

| Material | Weight kg | Composition weight % | | | | |
|---|---|---|---|---|---|---|
| | | Cu | Co | Fe | S | C |
| copper matte | 1,600 | 38.1 | 0.7 | 30.2 | 20.1 | |
| converter slag | 10,000 | 4.6 | 0.8 | 51.6 | | |
| carbide | 260 | | | | | |
| treated slag | 9,500 | 1.3 | 0.3 | 51.2 | | |
| tops | 1,500 | 58.8 | 0.6 | 16.2 | 22.2 | |
| bottoms | 450 | 8.3 | 11.8 | 72.4 | 0.9 | 2.5 |

EXAMPLE 5

A copper matte of a similar composition to those produced in Examples 1, 2 and 3 was melted in an electric furnace equipped with tuyeres and was bessemerized with addition of silica sand. The resulting slag was discharged when most of the iron in the matte was oxidized, and blowing was resumed until a sample of the molten copper wormed during solidification, then the finished crude copper was discharged. The scum formed was left in the furnace to be discharged separately from the copper by turning the furnace up-side-down. The operating temperature was about 1,250° C.

Weights and compositions of the charged and discharged materials are shown in Table 5.

Table 5

| Material | Weight kg | Composition weight % | | | |
|---|---|---|---|---|---|
| | | Ni | Cu | Fe | S |
| copper matte | 300 | 6.2 | 48.0 | 16.6 | 21.5 |
| silica sand | 20 | | | | |
| slag | 90 | 0.6 | 2.8 | 50.7 | |
| crude copper | 130 | 0.6 | 98.1 | tr | tr |
| scum | 50 | 29.7 | 21.3 | 6.3 | |

EXAMPLE 6

A nickel matte was melted in an electric furnace equipped with tuyeres and was bessemerized with the addition in two stages of one fifth each time of a high carbon ferrous alloy with a composition similar to that was produced in Example 3 and silica sand, and the resulting slag No. 1 was discharged. Blowing was resumed with addition of one fifth each time of the alloy and silica sand for three additional times, and the resulting slag No. 2 and finished matte were discharged after most of the iron charged was oxidized. The operating temperature was about 1,250° C.

Weights and compositions of the charged and discharged materials are shown in Table 6

Table 6

| Material | Weight kg | Composition weight % | | | | |
|---|---|---|---|---|---|---|
| | | Ni | Cu | Fe | S | C |
| nickel matte | 200 | 21.7 | 1.6 | 46.8 | 21.5 | |
| alloy | 200 | 27.7 | 5.3 | 62.2 | 0.8 | 2.5 |
| silica sand | 80 | | | | | |
| slag No. 1 | 190 | 2.8 | 0.2 | 49.8 | | |
| slag No. 2 | 180 | 3.5 | 0.7 | 48.3 | | |
| finished matte | 140 | 60.6 | 8.5 | 1.4 | 2.16 | |

Most of the nickel in the high carbon ferrous alloy was extracted as finished matte; and the copper content in the finished matte is small enough to be easily eliminated, for example, by electrorefining of nickel.

EXAMPLE 7

An alloy and a matte containing nickel, cobalt, copper and iron were treated in a manner similar to Example 3; and a result was obtained as shown in Table 7.

Table 7

| Material | Weight kg | Composition weight % | | | | | |
|---|---|---|---|---|---|---|---|
| | | Ni | Co | Cu | Fe | S | C |
| alloy | 40 | 17.6 | 9.2 | 10.2 | 61.1 | tr | 0.4 |
| matte | 5 | 31.6 | 1.3 | 18.2 | 23.3 | 20.8 | |
| top | 5 | 5.9 | 1.8 | 51.7 | 14.9 | 20.8 | |
| bottom | 39 | 19.8 | 8.2 | 5.7 | 60.2 | 0.7 | 2.6 |

Nickel and cobalt in the charge were mostly extracted as a high carbon ferrous alloy while copper, mostly as matte. This is an example where emphasis was laid on limiting the copper content of alloy with some of the nickel and cobalt remaining in the matte.

EXAMPLE 8

A high carbon ferrous alloy similar in composition to the bottom produced in Example 7 was treated similarly to Example 6, and a result was obtained as shown in Table 8.

Table 8

| Material | Weight kg | Composition weight % | | | | | |
|---|---|---|---|---|---|---|---|
| | | Ni | Co | Cu | Fe | S | C |
| nickel matte | 200 | 21.7 | 0.5 | 1.6 | 46.8 | 21.5 | |
| alloy | 200 | 20.2 | 8.6 | 5.3 | 59.1 | 0.3 | 2.5 |
| finished matte | 110 | 60.1 | 1.6 | 10.4 | 0.8 | 21.8 | |
| slag No. 1 | 200 | 3.1 | 2.9 | 0.3 | 50.6 | | |
| slag No. 2 | 180 | 3.8 | 5.5 | 0.6 | 48.6 | | |

This is an example where a high carbon ferrous alloy containing nickel and cobalt was treated jointly with nickel matte and the nickel content was extracted as finished matte while the cobalt content mostly as converter slag.

EXAMPLE 9

A copper matte similar in composition to the top product in Example 7 was treated similarly to Example 5; and a result was obtained as shown in Table 9. In addition, a sample of white metal was taken when the converter slag was discharged after the oxidation of iron was almost finished and the cobalt slag was discharged and a sample of unfinished crude metallic copper was taken with interruption of blowing when the matte had almost disappeared on the punching rod towards the end of copper blow.

Table 9

| Material | Weight kg | Composition weight % | | | | |
|---|---|---|---|---|---|---|
| | | Ni | Co | Cu | Fe | S |
| copper matte | 300 | 5.5 | 2.0 | 50.8 | 15.4 | 20.5 |
| converter slag | 85 | 0.4 | 4.5 | 3.1 | 46.8 | |
| white metal | | 6.5 | 0.8 | 63.6 | 2.5 | 21.6 |
| cobalt slag | 18 | 1.3 | 7.2 | 16.5 | 9.6 | |
| Unfinished copper | | 10.4 | 0.4 | 85.8 | 0.3 | 1.8 |
| finished copper | 130 | 0.5 | tr | 98.5 | tr | tr |
| scum | 45 | 29.2 | 1.5 | 22.7 | 7.7 | |

The result shows that the nickel and cobalt which were included partly in matte in Example 7 can be extracted with a good recovery as scum and converter slag respectively. Cobalt slag may preferably be reverted to the next batch of similar copper matte for treatment, for its copper grade is high.

EXAMPLE 10

A copper matte was melted in the electric furnace used in Example 6, and slag No. 1 and slag No. 2 I from Example 8 were smelted on the bath of matte with blowing for about two minutes. Weights and compositions of the charged and discharged materials are shown in Table 10.

Table 10

| Material | Weight kg | Composition weight % | | | | |
|---|---|---|---|---|---|---|
| | | Ni | Co | Cu | Fe | S |
| copper matte | 150 | tr | tr | 35.9 | 32.0 | 21.1 |
| slag No. 1 | 100 | 3.1 | 2.9 | 0.3 | 50.6 | |
| slag No. 2 | 80 | 3.8 | 5.5 | 0.6 | 48.6 | |
| discharged slag | 230 | 0.8 | 2.8 | 2.6 | 50.3 | |
| discharged matte | 90 | 2.6 | 0.8 | 52.8 | 11.8 | 20.8 |

This is an example of extracting nickel from a molten slag into copper matte by washing, leaving most of the cobalt in slag. Combining Example 8 and Example 10, it is clear that practically all of the nickel in a high carbon ferrous alloy can be extracted as finished matte: and it is also shown that the cobalt in the high carbon ferrous alloy is extracted as a cobaltiferous slag of low nickel content, as the nickel and cobalt contained in the copper matte can be extracted separately as is shown in Example 9.

EXAMPLE 11

Manganese nodule was crushed into sand and was smelted with the addition of silica sand and coke breeze. The result as shown in Table 11A was obtained. An alloy of a similar composition to the resultant alloy was treated similarly to Example 2, and the result as shown in Table was obtained.

Table IIA

| Material | Weight kg | Composition weight % | | | | | |
|---|---|---|---|---|---|---|---|
| | | Ni | Co | Cu | Fe | C | Mn |
| Manganese module | 2 | 1.2 | 0.5 | 0.9 | 19.0 | | 31.6 |
| silica sand | 0.1 | | | | | | |
| coke breeze | 0.1 | | | | | | |
| alloy | 0.17 | 11.7 | 3.6 | 8.5 | 69.7 | 0.8 | 0.9 |
| slag | 1.3 | tr | 0.1 | 0.2 | 18.6 | | 43.3 |

Table 11B

| Material | Weight kg | Composition weight % | | | | | | |
|---|---|---|---|---|---|---|---|---|
| | | Ni | Co | Cu | Fe | S | C | Mn |
| alloy | 20 | 11.1 | 3.8 | 9.0 | 68.1 | 1.1 | 1.2 | 1.0 |
| matte | 2 | 31.6 | 1.3 | 18.2 | 23.3 | 20.8 | | |
| top | 2 | 4.8 | 0.9 | 43.7 | 17.3 | 21.0 | | 2.3 |
| bottom | 19 | 13.2 | 4.0 | 4.3 | 68.4 | 0.8 | 2.6 | 0.7 |

The resulting bottom alloy can be treated similarly to Examples 7 to 10 to recover copper, nickel and cobalt.

EXAMPLE 12

A white metal containing cobalt and nickel was melted in the furnace used in Example 5 and was bessemerized. Blowing was interrupted several times towards the end and samples of crude copper, matte and slag were taken. Bessemerization was finished after blowing upto the ordinary point of copper smelting then and the resultant crude copper and scum were discharged. Weights of the charged and discharged materials and compositions of the samples of the charged and discharged materials are shown in Table 12. K in the table was calculated according to the following equation, and A, B, C in the table are for crude copper, matte and slag respectively, while 1, 2, and 3 are samples in the order of taking, and 4 is for discharged materials.

$$K = \frac{(Co\ weight\ \%\ in\ slag)(Ni\ weight\ \%\ in\ crude\ copper\ or\ matte)}{(Co\ weight\ \%\ in\ crude\ copper\ or\ matte)(Ni\ weight\ \%\ in\ slag)}$$

Table 12

| Material | Weight kg | Composition weight % | | | | | |
|---|---|---|---|---|---|---|---|
| | | Co | Cu | Fe | S | Ni | K |
| white metal | 72 | 0.9 | 69.6 | 2.6 | 20.1 | 1.0 | |
| 1A | | 0.8 | 92.4 | 0.5 | 1.8 | 2.5 | 47 |
| 1B | | 1.0 | 78.5 | 1.4 | 17.5 | 1.1 | 16 |
| 1C | | 7.5 | 7.2 | 32.4 | | 0.5 | |
| 2A | | 0.4 | 94.4 | 0.2 | 1.6 | 2.1 | 133 |
| 2C | | 7.6 | 6.8 | 35.3 | | 0.3 | |
| 3A | | 0.2 | 96.2 | 0.1 | 1.2 | 1.7 | 63 |
| 3C | | 6.7 | 14.8 | 30.1 | | 0.9 | |
| 4A | 46 | 0.05 | 98.0 | 0.03 | 0.04 | 0.5 | 18 |
| 4C | 13 | 4.6 | 22.9 | 24.2 | | 2.9 | |

As indicated by the values of K in the table the, separation of nickel and cobalt is the best in the case of 2A and 2C while it is poor in case of ordinary finishing in copper smelting which is shown by 4A and 4C. The sulfur content of the crude copper 2A is much higher than the finished copper, showing 1.6% S. Iron in the products is more in amount than in the charge because of the accretion to the furnace being melted.

What is claimed is:

1. A process for separating at least one of and cobalt from copper comprising the steps of providing a molten mixture containing copper and at least one member selected from the group consisting of nickel and cobalt, metallic iron and carbon, at least some of the mixture being in the form of a matte, and allowing the mixture to form a high carbon ferrous alloy having a carbon content of at least 0.5% and a matte in two separate phases, thereby extracting the major part of said member in the formed high carbon ferrous alloy and the major part of the copper in the formed matte.

2. A process according to claim 1 wherein said mixture contains of an alloy.

3. A process according to claim 2 wherein said alloy contains at least one member selected from a group consisting of copper, iron, nickel, cobalt, carbon, and sulfur and the matte contains at least one member selected from a group consisting of copper sulfide, iron sulfide, nickel sulfide, and cobalt sulfide.

4. A process according to claim 1 wherein said mixture contains a sufficient amount of matte for extracting a major part of the copper into the formed matte.

5. A process according to claim 1 wherein said mixture contains a greater amount of metallic iron that the total amount of nickel and cobalt.

6. A process according to claim 1 wherein the matte contains predominantly at least one member selected from the group consisting of copper sulfide, iron sulfide, nickel sulfide, and cobalt sulfide.

7. A process according to claim 2 wherein the matte is obtained by a reaction of a part of the alloy with sulfur.

8. A process according to claim 1 wherein the mixture is effected by agitating said mixture in a furnace in the molten state.

9. The process according to claim 1 wherein carbon is provided in said mixture by passing said mixture through a column formed of lump carbon.

10. A process according to claim 2 wherein the alloy contains dissolved sulfide and is separated from the alloy through carburization of the alloy.

11. A process according to claim 1 wherein said high carbon ferrous alloy is formed from a matte containing dissolved metallic iron by carburization of the matte.

12. A process according to claim 8 wherein said mixture is made up by bringing a molten alloy and a molten matte together and passing the mixture through a column of lump carbon.

13. A process according to claim 2 wherein at least a portion of the mixture is provided by smelting an ore containing copper and at least one member selected from a group consisting of nickel and cobalt so that the copper and at least one member are in the alloy and matte.

14. A process according to claim 2 wherein at least a portion of the mixture is produced by smelting, under reducing conditions, an ore containing copper, iron and at least one member selected from the group consisting of nickel and cobalt in the oxidized state to extract the copper and at least one member as an alloy.

15. A process according to claim 2 wherein the alloy contains nickel, cobalt, copper and iron produced by reducing and smelting manganese nodule.

16. A process according to claim 2 wherein said alloy is provided by smelting manganese nodule and said matte is provided by smelting nickelcopper sulfide ore.

17. A process according to claim 13 wherein said mixture is provided by s id smelting with addition of a sufficient amount of solid carbon to effect a carburization of the alloy.

18. A process to claim 1 wherein said mixture is provided by smelting a molten slag containing at least one member of nickel and cobalt on a bath of molten matte containing at least copper and metallic iron.

19. A process according to claim 18 wherein said bath of molten matte containing metallic iron is obtained by dissolving a material containing metallic iron into a matte in the molten state.

20. A process according to claim 18 wherein metallic iron is produced by an exothermic reaction between oxidized iron in the slag and reducing agent and is dissolved into said bath of molten matte.

21. A process according to claim 1 further including the step of bessemerizing the formed high carbon ferrous alloy and formed matte separately.

22. A process according to claim 1 further including the step of bessemerizing the formed matte to extract nickel contained therein as scum and the copper is extracted as metallic copper.

23. A process according to claim 1 further including the step of bessemerizing formed high carbon ferrous alloy with the addition of a sulfur-bearing material to extract nickel in the alloy as a finished matte.

24. A process according to claim 23 wherein cobalt in the formed high carbon ferrous alloy is extracted in a converter slag.

25. A process according to claim 1 further including the step of bessemerizing the formed high carbon ferrous alloy together with matte containing copper, the cobalt in the formed alloy being extracted in a converter slag.

26. A process according to claim 18 wherein a material containing nickel and cobalt is smelted together with a cupriferous material to extract nickel and cobalt in the resulting copper matte, the resulting copper matte containing nickel and cobalt is bessemerized to extract cobalt as a converter slag, and the resulting molten converter slag is treated on said bath of copper matte containing metallic iron to yield the mixture whereby cobalt is finally extracted in the high carbon ferrous alloy and nickel is extracted as white metal containing nickel and thereby the separation of nickel and cobalt is effected.

27. A process according to claim 26 wherein the bessemerization of said resulting copper matte containing nickel and cobalt is suspended during copper blow near the point where white metal almost disappears and the cobalt remaining in white metal is extracted as an oxidized cobaltiferous material of low nickel grade.

28. A process according to claim 18 wherein a molten slag containing nickel and cobalt is washed with a molten copper matte free from metallic iron to extract nickel into the copper matte and the resulting molten cobaltiferous slag is treated on said bath of copper matte containing metallic iron to yield the mixture so that the cobalt is finally extracted in the high carbon ferrous alloy and nickel in the nickeliferous copper matte and separation of nickel and cobalt is effected.

29. A process according to claim 18 wherein a high carbon ferrous alloy containing nickel and cobalt is bessemerized with addition of a sulfur-bearing material and the resulting molten converter slag is treated on said bath of molten copper matte containing metallic iron whereby nickel is finally recovered as finished matte and cobalt as the secondary high carbon ferrous alloy and separation of nickel and cobalt is effected.

30. A process according to claim wherein said mixture includes an alloy containing metallic iron and having sulfides as a solute.

31. A process according to claim 1 wherein said mixture includes an alloy containing metallic iron and carbon and the matte includes at least one of the group consisting of nickel sulfide, cobalt sulfide, iron sulfide and copper sulfide.

32. A process according to claim 1 wherein the matte contains the metallic iron as a solute.

33. A process according to claim 1 wherein the mixture is agitated in forming the high carbon ferrous alloy and the matte in two separate phases.

* * * * *

UNITED STATES PATENT AND TRADEMARK OFFICE
CERTIFICATE OF CORRECTION

PATENT NO. : 4,108,638
DATED : August 22, 1978
INVENTOR(S) : Sanai Nakabe

It is certified that error appears in the above-identified patent and that said Letters Patent are hereby corrected as shown below:

Column 1, line 9, cancel "an" and insert -- as --

Column 1, line 25, cancel "in" (second occurrence) and insert -- is --

Column 1, line 49, cancel "mate" and insert -- matte --

Column 1, line 50, cancel "therely" and insert -- thereby --

Column 1, line 63, cancel "pulveried" and insert -- pulverized

Column 2, line 54, after "in" (second occurrence) insert -- the --

Column 3, line 26, after "in" (second occurrence) insert -- the --

Column 3, line 53, cancel "complete. When" and insert -- complete when --

Column 3, line 55, cancel "1.150° C." and insert -- 1,150° C. --

Column 3, line 59, cancel "reducing smelting" to -- reducing-smelting --

UNITED STATES PATENT AND TRADEMARK OFFICE
CERTIFICATE OF CORRECTION

PATENT NO. : 4,108,638
DATED : August 22, 1978
INVENTOR(S) : Sanai Nakabe

It is certified that error appears in the above-identified patent and that said Letters Patent are hereby corrected as shown below:

Column 6, line 19, cancel the colon (:) after "batch" and insert a semicolon (;)

Column 6, line 24, after "cobalt" insert -- to --

Column 6, line 59, cancel "tuveres" insert -- tuyeres --

Column 7, line 16, cancel "surface" and insert -- sulfate --

Column 7, line 51, cancel "and the"

Column 8, line 60, cancel "bassemerization" and insert -- bessemerization --

Column 12, line 6, cancel "2I" and insert -- 2 --

Column 12, line 24, cancel the colon (:) after "matte" and insert a semicolon (;)

Column 12, line 37, after "Table" insert -- 11B --

Column 12, line 38, cancel "Table IIA" and insert -- Table 11A --

Column 12, line 65, cancel "then and" and insert -- and then --

Column 13, line 2, cancel "equation, and" and insert -- equation. --

UNITED STATES PATENT AND TRADEMARK OFFICE
CERTIFICATE OF CORRECTION

PATENT NO. : 4,108,638
DATED : August 22, 1978
INVENTOR(S) : Sanai Nakabe

It is certified that error appears in the above-identified patent and that said Letters Patent are hereby corrected as shown below:

Column 13, line 24, after "table" insert a comma (,)

Column 13, line 24, remove the comma after "the" (third occurrence)

Column 13, line 33, after "of" insert -- nickel --

Column 13, line 45, cancel "of"

Column 13, line 56, cancel "that" and insert -- than --

Column 14, line 1, cancel "The" and insert -- A --

Column 14, line 31, cancel "nickelcopper" and insert -- nickel - copper --

Column 14, line 33, cancel "s id" and insert -- said --

Column 14, line 36, after "process" insert -- according --

Signed and Sealed this

Ninth Day of October 1979

[SEAL]

Attest:

RUTH C. MASON
Attesting Officer

LUTRELLE F. PARKER
Acting Commissioner of Patents and Trademarks